United States Patent
Jiang et al.

(10) Patent No.: US 11,225,422 B2
(45) Date of Patent: Jan. 18, 2022

(54) FIELD GROUNDWATER FILTERING AND SAMPLING AND MOVING-WATER FLOW INDEX MEASURING DEVICE AND METHOD

(71) Applicant: CHINESE RESEARCH ACADEMY OF ENVIRONMENTAL SCIENCES, Beijing (CN)

(72) Inventors: Yonghai Jiang, Beijing (CN); Yongfeng Jia, Beijing (CN); Beidou Xi, Beijing (CN); Xinying Lian, Beijing (CN); Yu Yang, Beijing (CN); Xiangjian Xu, Beijing (CN); Fan Feng, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 16/887,556

(22) Filed: May 29, 2020

(65) Prior Publication Data
US 2020/0377389 A1 Dec. 3, 2020

(30) Foreign Application Priority Data
May 30, 2019 (CN) .......................... 201910466624.5

(51) Int. Cl.
*C02F 1/52* (2006.01)
*G01N 27/00* (2006.01)
(Continued)

(52) U.S. Cl.
CPC ................ *C02F 1/52* (2013.01); *C02F 1/001* (2013.01); *C02F 2103/06* (2013.01);
(Continued)

(58) Field of Classification Search
CPC ............ C02F 1/52; C02F 1/001; G01N 27/00
(Continued)

(56) References Cited

U.S. PATENT DOCUMENTS

| 5,646,863 A | * | 7/1997 | Morton | .................. G01N 33/18 |
| | | | | 210/688 |
| 2010/0078372 A1 | * | 4/2010 | Kerfoot | ................. B01F 3/0451 |
| | | | | 210/150 |

(Continued)

FOREIGN PATENT DOCUMENTS

CN 206095696 U * 4/2017 ............... G01N 1/14

OTHER PUBLICATIONS

IP.com—Machine English Translation CN 206095696, Publication Date Apr. 2017 (Year: 2017).*

(Continued)

*Primary Examiner* — Nina Bhat
(74) *Attorney, Agent, or Firm* — Procopio, Cory, Hargreaves & Savitch LLP

(57) ABSTRACT

A field groundwater filtering sampling and moving-water flow index measuring device comprises a precipitation tank, an electrode measuring column of moving-water flow, a suction filter unit and a control unit; also provided is a measuring method by adopting the index measuring device. Sample filtering and electrode measuring work in the field groundwater sampling process can be integrally solved, sampling time point selection after well washing is scientifically and automatically achieved, and the sample filtering and collecting efficiency is remarkably improved; and meanwhile, the accuracy of testing various in-situ indexes such as pH value, oxidation reduction potential and the like in groundwater is remarkably improved in the design of moving-water flow electrode measurement. The method has good application prospect and value for carrying out groundwater monitoring and evaluation, remediation and governance, and the like.

8 Claims, 1 Drawing Sheet

(51) Int. Cl.
*C02F 1/00* (2006.01)
*C02F 103/06* (2006.01)

(52) U.S. Cl.
CPC .... *C02F 2209/003* (2013.01); *C02F 2209/04* (2013.01); *C02F 2209/06* (2013.01); *C02F 2209/40* (2013.01); *G01N 27/00* (2013.01)

(58) Field of Classification Search
USPC ........ 210/747; 422/68.1, 82.02, 81; 166/336
See application file for complete search history.

(56) References Cited

U.S. PATENT DOCUMENTS

| | | | | |
|---|---|---|---|---|
| 2013/0220941 A1* | 8/2013 | Kekko | ............... | G01N 33/1826 210/748.1 |
| 2013/0284678 A1* | 10/2013 | Daly | ............ | C02F 1/008 210/722 |
| 2014/0102182 A1* | 4/2014 | Halden | ............ | G01N 1/10 73/61.73 |
| 2016/0375383 A1* | 12/2016 | Mazor | ............ | B01D 29/117 210/93 |

OTHER PUBLICATIONS

Notification to Grant Patent Right for Invention dated Sep. 3, 2021 from counterpart CN Patent Application No. 201910466624.5, 6 pages.

\* cited by examiner

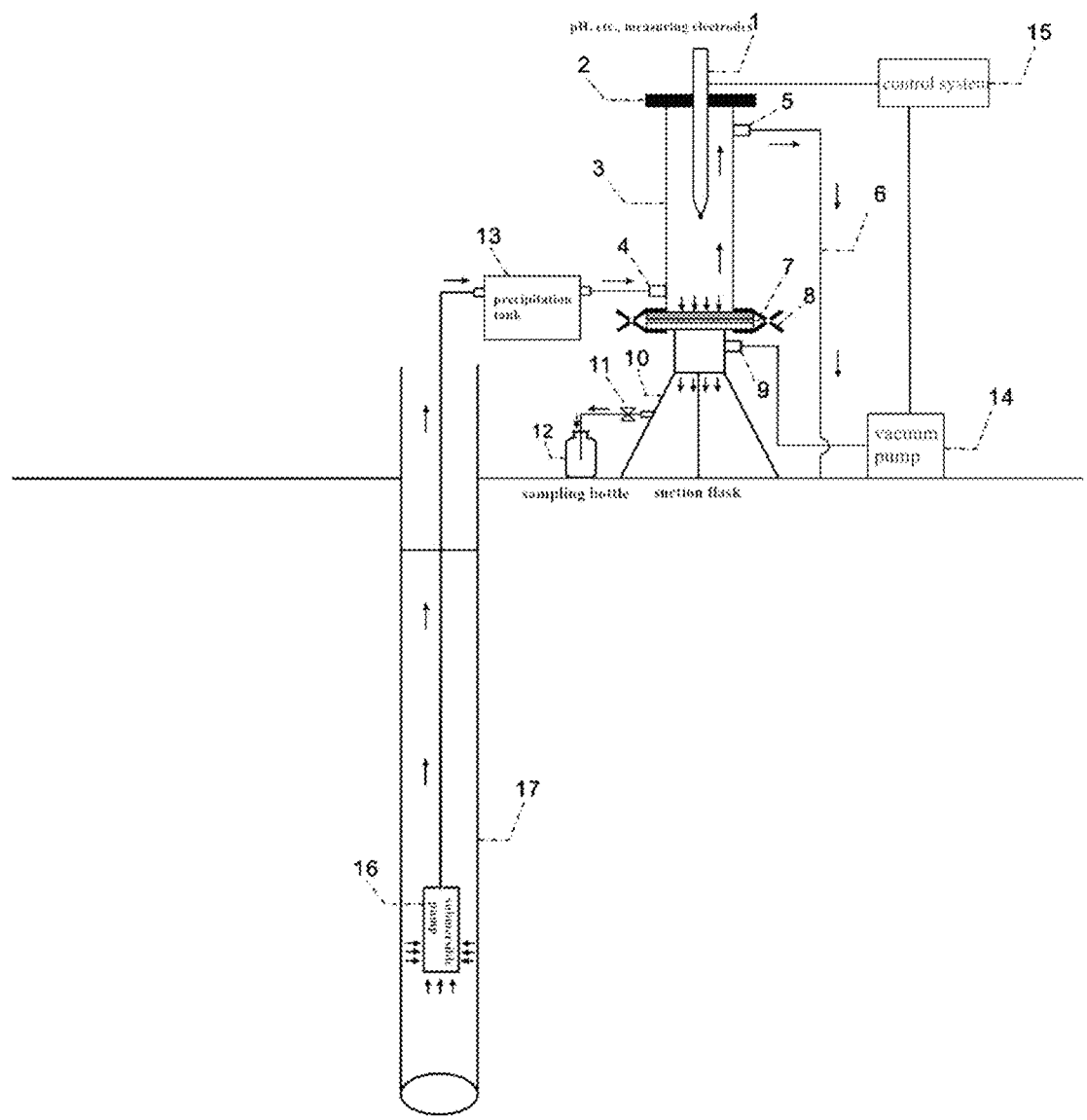

FIELD GROUNDWATER FILTERING AND SAMPLING AND MOVING-WATER FLOW INDEX MEASURING DEVICE AND METHOD

CROSS-REFERENCE TO RELATED APPLICATIONS

This application claims priority to Chinese Patent Application No. 201910466624.5, filed May 30, 2019, the contents of which are incorporated herein by reference.

TECHNICAL FIELD

The invention relates to a groundwater monitoring and evaluation and pollution remediation technology in the field of environmental protection, in particular to a field groundwater filtering and sampling and moving-water flow index measuring device and method.

BACKGROUND ART

The collection of groundwater samples is the premise of groundwater monitoring and evaluation, remediation and governance, and environmental management. How to ensure the representativeness of the collected samples and the accuracy of the measurement of various changeable physical and chemical indexes in extracted groundwater is a problem that must be solved in the field sample collection work. In the prior art, the confirmation of the collection time of the groundwater samples after well washing is usually carried out by empirical judgment, or the collection groundwater is subjected to static electrode determination for the confirmation, easily causing the unscientific and inaccurate judgment of sampling time; a manual needle tube filtering mode is usually adopted for in-situ filtering, with low sampling efficiency; in-situ pH and oxidation reduction potential (ORP) determinations are often carried out using static water, which is easily affected by surface temperature, air, light and so on, and it is difficult to ensure the accuracy of the determination.

SUMMARY OF THE INVENTION

Therefore, the invention is mainly directed to provide a field groundwater filtering and sampling and moving-water flow index measuring device and method to at least partially solve at least one of the technical problems.

In order to achieve the above object, as one aspect of the present invention, there is provided a field groundwater filtering and sampling and moving-water flow index measuring device, comprising:

a precipitation tank directly connected with a pump via a pipeline and configured for preprocessing continuously pumped groundwater;

an electrode measuring column of moving-water flow configured for realizing electrode measurement of physical and chemical indexes of dynamic water flow;

a suction filter unit connected with a water flow channel where the electrode measuring column of moving-water flow is located via a filtering membrane unit, so that a water sample can be collected while the electrode measurement of the dynamic water flow is realized; and a control unit configured for monitoring the electrode measuring column of moving-water flow and the suction filter unit to realize accurate determination and control of sample collection time.

Among them, the precipitation tank adopts a brown or dark and transparent design, and is made of, such as, PP or PET.

The electrode measuring column of moving-water flow is a cylindrical structure, the bottom thereof is provided with a water inlet, the top thereof is provided with a water outlet at a side circumferentially opposite to the water inlet, and the electrode measuring column of moving-water flow is externally connected with a drainage pipeline; an upper sealing cover with a porous design is arranged at the top of the electrode measuring column of moving-water flow, and a plurality of electrodes selected from a pH electrode, an oxidation-reduction potential (ORP) electrode and/or an electrical conductivity (Ec) electrode can be inserted in the upper sealing cover; the electrode socket on the sealing cover is designed by adopting a waterproof gasket to be suitable for internal connection requirements of electrodes with different diameters, and also a fixing cap cover is designed for blocking the electrode socket when no electrode exists in the electrode socket; in order to be suitable for a common groundwater multi-parameter electrode measuring device, a cylindrical porous protective cover is arranged outside an electrode testing part thereof, and the sealing cover with a large caliber is designed for use; and the bottom of the electrode measuring column of moving-water flow is provided with a lower sealing cover, and the sealing cover has a hollow design.

The suction filter unit comprises a suction filter container, a suction pipeline and a vacuum pump, wherein the suction filter container is, for example, a suction flask, adopts a brown or dark and transparent design, and is made of, for example, glass or plastic; and the vacuum pump is used to provide power for water to flow through a membrane during the vacuumizing.

The bottom of the electrode measuring column of moving-water flow is connected with the top of the suction flask, and the both are connected by a fixing clip; and a porous medium design is adopted for the mouth of the suction flask, and filtering membranes with different pore diameters can be placed on an upper part of the suction flask.

The device further comprises a sampling unit, wherein the sampling unit comprises a water outlet outside the suction flask, an airtight control valve, a water passing pipeline and a sampling bottle, and is used for sending by the sampling bottle a collected water sample to a laboratory for detection.

As another aspect of the present invention, there is provided a moving-water flow index measuring method by using the field groundwater filtering and sampling and moving-water flow index measuring device as described above, comprising the steps of:

when well washing by the groundwater is completed, automatically starting the vacuum pump after the electrode indexes are stabilized for several minutes according to requirements of different sampling situations, so that the sample collection time is accurately determined; and closing the airtight control valve of the sampling unit when the suction filter unit works so as to ensure the stable operation of the suction filter unit; after the sample of the suction flask reaches ⅔, closing the suction filter unit by the control unit, and opening the airtight control valve and 9 valves for sample collection, wherein the suction filter unit/the sampling unit are opened and closed cyclically according to the collection amount of the sample.

The flow speed of groundwater by a submersible pump matched with the device is 30%-50% higher than a suction filtration speed of water by the vacuum pump so as to ensure that enough water flows upwards in the electrode measuring column of moving-water flow, which provides a guarantee for electrode measurement; meanwhile, the flow speed needs to be moderate; and otherwise, excessive water flow disturbance can influence test stability and accuracy of the electrode.

Based on the technical solution, the field groundwater filtering and sampling and moving-water flow index measuring device has at least one of the following beneficial effects compared with the prior art:

1. The field groundwater filtering and sampling and moving-water flow index measuring device of the invention successfully realizes effective integration of an automatic filtering and moving-water flow index measuring device, and a control system connected with both can effectively regulate and control sampling time points of samples so as to remarkably improve sampling efficiency and accuracy of in-situ index testing, which integrally solves main problems faced by field groundwater in-situ sampling;

2. According to the invention, sample filtering and electrode measuring work required in the field groundwater sampling process can be integrally solved, sampling time point selection of a sample after well washing is scientifically and automatically realized, and the sample filtering and collecting efficiency is remarkably improved; and meanwhile, the accuracy of testing various in-situ indexes such as pH value, oxidation reduction potential and the like in groundwater is remarkably improved in the design of moving-water flow electrode measurement. The method has good application prospect and value for carrying out groundwater monitoring and evaluation, remediation and governance, and the like.

BRIEF DESCRIPTION OF THE DRAWINGS

FIG. 1 is a schematic diagram of a field groundwater filtering and sampling and moving-water flow index measuring device according to the present invention.

DETAILED DESCRIPTION OF THE INVENTION

To further clarify the objects, aspects, and advantages of the present invention, a more particular description of the invention will be rendered by specific embodiments thereof with reference to the accompanying drawings.

The invention aims to effectively solve the key problems of field groundwater sampling time selection, sample efficient collection, accurate in-situ measurement of mutable indexes and the like, thereby developing a field groundwater filtering and sampling and moving-water flow index measuring device which can effectively realize the purposes of scientifically regulating and controlling sample collection time, quick sample filtration collection, accurately measuring sample indexes and the like, so that the in-situ working efficiency and flow is optimized.

Specifically, the field groundwater filtering and sampling and moving-water flow index measuring device comprises:

a precipitation tank directly connected with a pump via a pipeline and configured for preprocessing a continuously pumped groundwater sample;

an electrode measuring column of moving-water flow configured for realizing electrode measurement of dynamic water flow;

a suction filter unit connected with a water flow channel where the electrode measuring column of moving-water flow is located via a filtering membrane unit, so that a water sample can be collected while the electrode measurement of the dynamic water flow is realized; and a control unit configured for monitoring the electrode measuring column of moving-water flow and the suction filter unit to realize accurate determination and control of sample collection time.

The precipitation tank adopts a brown or dark and transparent design, and is made of, such as PP, PET and the like.

The electrode measuring column of moving-water flow is a cylindrical structure, the bottom thereof is provided with a water inlet, the top thereof is provided with a water outlet at a side circumferentially opposite to the water inlet, and the electrode measuring column of moving-water flow is externally connected with a drainage pipeline. An upper sealing cover with a porous design is arranged at the top of the electrode measuring column of moving-water flow, and a plurality of electrodes, such as a pH electrode, an oxidation-reduction potential (ORP) electrode and/or a electrical conductivity (Ec) electrode and the like can be inserted in the upper sealing cover. The electrode socket on the sealing cover is designed by adopting a waterproof gasket to be suitable for internal connection requirements of electrodes with different diameters, and also a fixing cap cover is designed for blocking the electrode socket when no electrode exists in the electrode socket; in order to be suitable for a common groundwater multi-parameter electrode measuring device, a cylindrical porous protective cover is arranged outside an electrode testing part thereof, and the sealing cover with a large caliber is designed for use; and the bottom of the electrode measuring column of moving-water flow is provided with a lower sealing cover, and the sealing cover has a hollow design.

The suction filter unit comprises a suction filter container, a suction pipeline and a vacuum pump, wherein the suction filter container is, for example, a suction flask, adopts a brown or dark and transparent design, and is made of, such as, glass or plastic; and the vacuum pump is used to provide power for water to flow through a membrane during the vacuumizing.

The bottom of the electrode measuring column of moving-water flow is connected with the top of the suction flask, and the both are connected by a fixing clip; and a porous medium design is adopted for the mouth of the suction flask, and filtering membranes with different pore diameters can be placed on an upper part of the suction flask.

The field groundwater filtering and sampling and moving-water flow index measuring device further comprises a sampling unit, wherein the sampling unit comprises a water outlet outside the suction flask, an airtight control valve, a water passing pipeline and a sampling bottle, and is used for sending by the sampling bottle a collected water sample to a laboratory for detection.

The invention also discloses a moving-water flow in-situ index measuring method by using the field groundwater filtering and sampling and moving-water flow in-situ index measuring integrated device, which comprises the steps of:

when well washing by the groundwater is completed, automatically starting the vacuum pump after the electrode indexes are stabilized for several minutes according to requirements of different sampling situations, so that the sample collection time is accurately determined; and closing the airtight control valve of the sampling unit when the suction filter unit works so as to ensure the stable operation of the suction filter unit; after the sample of the suction flask reaches ⅔, closing the suction filter unit by the control unit, and opening the airtight control valve and 9 valves for sample collection, wherein the suction filter unit/the sampling unit are opened and closed cyclically according to the collection amount of the sample;

The flow speed of groundwater by a submersible pump matched with the device is 30%-50% higher than a pumping and filtering speed of water by the vacuum pump so as to ensure that enough water flows upwards in the electrode measuring column of moving-water flow, which provides a guarantee for electrode measurement; meanwhile, the flow speed needs to be moderate; and otherwise, excessive water flow disturbance can influence test stability and accuracy of the electrode.

The technical solution of the present invention is further illustrated by the following specific embodiments in conjunction with the accompanying drawings.

As shown in FIG. 1, the field groundwater filtering and sampling and moving-water flow index measuring device comprises a precipitation tank, an electrode measuring column of moving-water flow, a suction filter system, a control system and a sample collection system.

In the FIG. 1, reference numerals have the following meanings:

1. pH, etc., measuring electrodes; 2, an upper sealing cover of a moving-water flow column; 3, a moving-water flow column; 4, a water inlet of the moving-water flow column; 5, a water outlet of the moving-water flow column; 6, a drainage pipeline of the moving-water flow column; 7, a filtering membrane; 8, a fixing clip; 9, a suction opening of a suction flask; 10, a suction flask; 11, an airtight control valve; 12, a sampling bottle; 13, a precipitation tank; 14, a vacuum pump; 15, a control system; 16, a submersible pump; 17, a monitoring well.

Specifically, groundwater pumped by a submersible pump 16 placed in a monitoring well 17 enters a precipitation tank 13 through a pipeline, then enters a moving-water flow column 3 through a pipeline and a water inlet 4 of the moving-water flow column, a part of water flows upwards from the bottom of the column, providing a dynamic water flow measurement mode for pH, etc., measurement electrodes 1 fixed on an upper sealing cover 2 of the moving-water flow column, and the water flows out from a water outlet 5 of the moving-water flow column through a drainage pipeline 6 of the moving-water flow column; the other part of water flows into a suction flask through a filtering membrane 7 between the bottom of the moving-water flow column 3 and the top of the suction flask 10, the bottom of the moving-water flow column 3 and the top of the suction flask 10 are fixed by a fixing clip 8, and vacuum conditions by a vacuum pump 14 connected with a suction opening 9 of the suction flask provide power for the water flow to pass through the membrane; the suction flask 10 is provided with a water outlet and externally connected with an airtight control valve 11, and the suction flask 10 is connected with a sampling bottle 12 through a pipeline; and a control system 15 is connected to the pH, etc., measuring electrodes 1 and the vacuum pump 14 of the suction filter system.

When the device operates, the precipitation tank arranged at the front end slows down groundwater flow, so that particles in partially turbid groundwater can be effectively precipitated, and the water quality condition entering a water sample measuring and sample collecting system is improved.

The upper sealing cover of the moving-water flow column has a porous design, and a plurality of electrodes, such as a pH electrode, an oxidation-reduction potential (ORP) electrode and/or an electrical conductivity (Ec) electrode and the like, can be placed at the same time. The electrode socket on the sealing cover is designed by adopting a waterproof gasket to be suitable for internal connection requirements of electrodes with different diameters, and also a fixed cap cover is designed and used when no electrode exists in the socket. Meanwhile, in order to be suitable for a common groundwater multi-parameter electrode measuring device, a cylindrical porous protective cover is arranged outside an electrode testing part thereof, and a sealing cover with a large caliber is designed for use.

The precipitation tank, the moving-water flow column and the suction flask all adopt brown or dark and transparent design, do that the influence of illumination, external temperature and other conditions on the groundwater quality condition can be remarkably reduced, and the water flow condition in the system can also be observed.

The control principle of the control system is that, after well washing by groundwater is completed, a vacuum pump system can be automatically started after electrode indexes such as pH, electrical conductivity and the like are stabilized for several minutes according to requirements of different sampling situations, so that the sample collection time is accurately determined and controlled.

The airtight control valve of the sampling system is closed when the suction filter system works so as to ensure the stable operation of the suction filter system; after the sample of the suction flask reaches ⅔, the suction filter system is closed by the control system, and the airtight control valve and 9 valves are opened for sample collection, wherein the suction filter system/the sampling system can be opened and closed cyclically according to the collection amount of the sample.

The flow speed of groundwater by a submersible pump matched with the device is around 30%-50% higher than a suction filtration speed of water by the vacuum pump so as to ensure that enough water can flow upwards in the moving-water flow column, which provides a guarantee for electrode measurement; meanwhile, the flow speed needs to be moderate; and otherwise, excessive water flow disturbance can influence test stability and accuracy of the electrode.

The above-described embodiments provide a further detailed description for objects, technical solutions, and advantages of the present invention. It should be understood that the above-described embodiments are merely exemplary of the invention, and are not intended to limit the invention. Any modification, equivalent replacement, improvement etc. made within the spirit and principle of the invention shall be included in the scope of protection of the invention.

The invention claimed is:

1. A field groundwater filtering, sampling, and moving-water flow index measuring device comprising:
    a precipitation tank configured to preprocess the groundwater continuously extracted through a pipeline from a monitoring well;
    a moving-water flow column comprising a water inlet connected with a first water outlet of the precipitation tank, the moving-water flow column configured to receive the groundwater from the precipitation tank via the water inlet;
    a measuring electrode housed in the moving-water flow column at a first end of the moving-water flow column and configured to measure physical and chemical indexes of dynamic moving-water flow in the moving-water flow column;
    a suction filter unit connected at a second end of the moving-water flow column opposite the first end and configured to form a moving-water flow channel between the measuring electrode in the moving-water flow column and the suction filter unit via a filtering membrane unit, wherein the suction filter unit is configured to collect a groundwater sample while the measuring electrode measures the physical and chemical indexes of the dynamic moving-water flow; and a control unit configured to monitor the measurements by the measuring electrode and the suction filter unit to accurately determine and control collection time of the groundwater sample.

2. The index measuring device according to claim 1, wherein the precipitation tank comprises a brown or dark and transparent design, and is made of PP or PET.

3. The index measuring device according to claim 1, wherein the moving-water flow column is a cylindrical structure, the water inlet located at a side of the cylindrical structure proximal to the second end, a second water outlet provided proximal to the first end at a side circumferentially opposite to the water inlet, and the second water outlet of the moving-water flow column is externally connected to a drainage pipeline;

an upper sealing cover is arranged at the first end of the move-water flow column, and a plurality of electrode sockets are arranged on the sealing cover, wherein the measuring electrode comprises one or more electrodes inserted into the electrode sockets and selected from a pH electrode, an oxidation-reduction potential (ORP) electrode, and an electrical conductivity (Ec) electrode;

the electrode sockets on the upper sealing cover each comprising a waterproof gasket suitable for internal connection of electrodes with different diameters, and a fixing cap cover that blocks a respective electrode socket when a measuring electrode is not inserted into the respective electrode socket;

wherein the upper sealing cover is a cylindrical porous protective cover, and comprises a fixed cap with a caliber that is larger than the first end of the moving-water flow column; and wherein the second end of the moving-water flow column is provided with a lower sealing cover, and the sealing cover has a hollow design.

4. The device according to claim 1, wherein the suction filter unit comprises a suction filter container, a suction pipeline and a vacuum pump, wherein the suction filter container is a suction flask, comprises a brown or dark and transparent design, and is made of glass or plastic; and the vacuum pump is configured to provide power for water to flow through a membrane during the vacuumizing.

5. The device according to claim 1, wherein the second end of the moving-water flow column is connected with a first end of the suction flask, and both of the second end of the moving-water flow column and the first end of the suction flask are connected by a fixing clip; and the suction flask comprises a mouth having a porous medium design, and the filter membrane unit is configured to receive filtering membranes of different pore diameters placed on the first end of the suction flask.

6. The index measuring device according to claim 1, further comprising a sampling unit connected to a third water outlet of the suction flask, wherein the sampling unit comprises an airtight control valve connected to the third water outlet, a water passing pipeline, and a sampling bottle configured to receive the collected groundwater sample, and, wherein the sample bottle is used for sending the collected groundwater sample to a laboratory for detection.

7. A moving-water flow index measuring method comprising:

providing groundwater to a moving-water flow column, the groundwater extracted through a pipeline from a monitoring well via a submersible pump;

measuring, using a measuring electrode, indexes of dynamic moving-water flow in the moving-water flow column, the measuring electrode provided at a first end of the moving-water flow column opposite a suction filter unit connected to a second end of the moving-water flow column;

when well washing by the groundwater is completed, determining that the indexes of the dynamic moving-water low has stabilized for an amount of time, the amount of time selected from a plurality of amounts of time according to requirements of a different sampling situations, automatically starting, by a control unit, a vacuum pump of the suction filter unit in response to determining that the indexes are stabilized; and closing an airtight control valve of the sampling unit while the vacuum pump of the suction filter unit operates so as to ensure stable operation of the suction filter unit;

after a suction flask of the suction filter unit reaches ⅔ full of groundwater, closing the suction filter unit, by the control unit, and opening the airtight control valve and a plurality valves for sample collection into a sampling bottle, wherein the suction filter unit and the sampling unit are opened and closed cyclically according to a collection amount of the sample of the groundwater; and determining a sample collection time for collection of the amount of the sample of the groundwater.

8. The measuring method according to claim 7, wherein a flow speed of groundwater by the submersible pump into the moving-water flow column is 30-50% higher than a suction filtration speed of the groundwater by the vacuum pump such that water flows in a direction toward the measuring electrode in the moving-water flow column, which provides for measuring the indexes of the dynamic moving-water by the measuring electrode.

* * * * *